US005946610A

United States Patent [19]

Hama

[11] Patent Number: 5,946,610

[45] Date of Patent: Aug. 31, 1999

[54] PORTABLE RADIO APPARATUS HAVING A SLOT ANTENNA

[75] Inventor: Norio Hama, Suwa, Japan

[73] Assignee: Seiko Epson Corporation, Tokyo, Japan

[21] Appl. No.: 08/538,788

[22] Filed: Oct. 3, 1995

[30] Foreign Application Priority Data

Oct. 4, 1994 [JP] Japan .................................... 6-240227

[51] Int. Cl.[6] ........................................ H04B 1/08

[52] U.S. Cl. .......................... 455/351; 455/575; 455/269; 455/38.1; 343/702; 343/746; 343/767

[58] Field of Search ................................ 455/89, 90, 95, 455/128, 129, 269, 344, 347, 349, 351, 296, 303, 324, 313, 271, 278.1, 127, 343, 575, 571, 550, 38.1–38.4; 343/702, 718, 767, 770, 746, 769; 340/825.44

[56] References Cited

U.S. PATENT DOCUMENTS

| | | | |
|---|---|---|---|
| 2,070,088 | 2/1937 | Montaruli | 455/347 |
| 2,507,528 | 5/1950 | Kandogan . | |
| 2,611,865 | 9/1952 | Alford | 343/767 |
| 2,625,654 | 1/1953 | Alford | 343/767 |

(List continued on next page.)

FOREIGN PATENT DOCUMENTS

| | | |
|---|---|---|
| 0 122 485 | 10/1984 | European Pat. Off. . |
| 0 372 430 | 6/1990 | European Pat. Off. . |
| 0 538 485 | 4/1993 | European Pat. Off. . |
| 0 565 725 A1 | 10/1993 | European Pat. Off. . |

(List continued on next page.)

OTHER PUBLICATIONS

Motorola Technical Developments, vol. 11, Oct. 1, 1990—"Belt Loop Antenna" by Michael Goldenberg.

Hideo Ito et al., "A Small–Loop Antenna for Pocket–Size VHF Radio Equipment," *National Technical Report*, vol. 19 No. 2, Apr. 1973.

K. Fujimoto et al, "Small Antennas," *Research Studies Press Ltd.*

Teruhiko Fujisawa et al., "A Study on Small Slot Antenna for Wrist Watch Type Portable Radio Equipment," Technical Report of IEICE.

Hall, P.S. et al., "Survey of Design Techniques for Flat profile Microwave Antennas and Arrays," *The Radio and Electronic Engineer*, vol. 48, No. 11, pp. 549–565, Nov. 1978.

*Primary Examiner*—Doris H. To

*Attorney, Agent, or Firm*—Oliff & Berridge, PLC

[57] ABSTRACT

The invention provides a small portable radio apparatus including a slot antenna member. The slot antenna member has an improved form disposed in a casing. The casing has a curvedly bulging side edge surface. Thus, there is no useless space in the casing reducing the size of the portable radio apparatus. The slot antenna member has first and second conductive plates which form a slot groove at an outer peripheral edge of the first and second conductive plates. A short-circuiting element short-circuits the conductive plates with each other over the slot groove. A tuning capacitor element is connected to the first and second conductive plates at a position opposite to a position where the short-circuiting element is provided. The radio apparatus casing has a side portion which curvedly bulges toward an outer periphery thereof. The first and second conductive plates have central portions with openings and side portions which bulge slantingly toward outer peripheral edges thereof.

8 Claims, 15 Drawing Sheets

U.S. PATENT DOCUMENTS

| | | | |
|---|---|---|---|
| 2,629,051 | 2/1953 | Lindenblad . | |
| 3,172,112 | 3/1965 | Seeley . | |
| 3,210,766 | 10/1965 | Parker . | |
| 3,307,108 | 2/1967 | Induni | 343/898 |
| 3,918,062 | 11/1975 | Haruki et al. . | |
| 4,035,807 | 7/1977 | Tang et al. . | |
| 4,419,770 | 12/1983 | Yagi et al. . | |
| 4,509,053 | 4/1985 | Rubin et al. . | |
| 4,691,378 | 9/1987 | Kumamoto et al. | 455/301 |
| 4,713,808 | 12/1987 | Gaskill et al. . | |
| 4,736,390 | 4/1988 | Ward et al. | 455/324 |
| 4,775,866 | 10/1988 | Shibata et al. . | |
| 4,816,838 | 3/1989 | Mizuno et al. . | |
| 4,817,196 | 3/1989 | MacNak et al. . | |
| 4,862,181 | 8/1989 | Ponce de Leon et al. . | |
| 4,862,516 | 8/1989 | MacNak et al. . | |
| 4,873,527 | 10/1989 | Tan . | |
| 4,884,252 | 11/1989 | Teodoridis et al. . | |
| 4,920,353 | 4/1990 | Mori et al. . | |
| 4,955,084 | 9/1990 | Umetsu et al. . | |
| 4,973,944 | 11/1990 | Maletta . | |
| 4,975,711 | 12/1990 | Lee . | |
| 4,977,614 | 12/1990 | Kurcbart . | |
| 4,980,694 | 12/1990 | Hines . | |
| 5,001,778 | 3/1991 | Ushiyama et al. . | |
| 5,007,105 | 4/1991 | Kudoh et al. . | |
| 5,048,118 | 9/1991 | Brooks et al. . | |
| 5,079,559 | 1/1992 | Umetsu et al. . | |
| 5,113,196 | 5/1992 | Ponce de Leon et al. . | |
| 5,128,686 | 7/1992 | Tan et al. . | |
| 5,132,697 | 7/1992 | Tan . | |
| 5,134,418 | 7/1992 | Gomez et al. . | |
| 5,134,724 | 7/1992 | Gehring et al. . | |
| 5,138,651 | 8/1992 | Sudo | 455/569 |
| 5,144,325 | 9/1992 | Kurcbart . | |
| 5,179,733 | 1/1993 | Matsui . | |
| 5,182,568 | 1/1993 | Stamps, Jr. et al. . | |
| 5,227,804 | 7/1993 | Oda . | |
| 5,231,407 | 7/1993 | McGirr et al. . | |
| 5,265,265 | 11/1993 | Hama et al. . | |
| 5,280,296 | 1/1994 | Tan et al. . | |
| 5,280,646 | 1/1994 | Koyama et al. . | |
| 5,465,098 | 11/1995 | Fujisawa et al. | 343/767 |
| 5,589,840 | 12/1996 | Fujisawa | 343/702 |
| 5,621,419 | 4/1997 | Meek et al. | 343/770 |

FOREIGN PATENT DOCUMENTS

| | | | |
|---|---|---|---|
| B-10 90 140 | 9/1960 | Germany . | |
| 31-5906 | 6/1954 | Japan . | |
| 31-5906 | 7/1956 | Japan . | |
| 55-12762 | 4/1980 | Japan . | |
| 56-27514 | 3/1981 | Japan . | |
| 56-169401 | 12/1981 | Japan . | |
| 58-94204 | 6/1983 | Japan . | |
| 59-44103 | 3/1984 | Japan . | |
| 0607204 | 1/1985 | Japan | 343/702 |
| 60-239106 | 11/1985 | Japan . | |
| 61-26307 | 2/1986 | Japan . | |
| 61-200702 | 9/1986 | Japan . | |
| 61-50542 | 11/1986 | Japan . | |
| 62-24705 | 2/1987 | Japan . | |
| 63-163185 | 7/1988 | Japan . | |
| 64-34414 | 2/1989 | Japan . | |
| 1-34414 | 10/1989 | Japan . | |
| 2-140002 | 5/1990 | Japan . | |
| 3-88404 | 4/1991 | Japan . | |
| 3-147406 | 6/1991 | Japan . | |
| 3-181208 | 8/1991 | Japan . | |
| 4-211522 | 8/1992 | Japan . | |
| 2 165 396 | 4/1986 | United Kingdom . | |
| 2 201 266 | 8/1988 | United Kingdom . | |
| 2 216 726 | 10/1989 | United Kingdom . | |
| 2-217 112 | 10/1989 | United Kingdom . | |
| A-2 217 13 | 10/1989 | United Kingdom . | |
| 2 229 319 | 9/1990 | United Kingdom . | |
| 2 240 219 | 7/1991 | United Kingdom . | |
| 2 248 522 | 4/1992 | United Kingdom . | |
| 2 251 520 | 7/1992 | United Kingdom . | |
| A-2 276 274 | 9/1994 | United Kingdom . | |
| WO 91/02386 | 2/1991 | WIPO . | |

PORTABLE RADIO APPARATUS HAVING A SLOT ANTENNA

BACKGROUND OF THE INVENTION

1. Field of the Invention

The invention relates to a portable radio apparatus. In particular, this invention relates to a structure of a slot antenna member in a casing.

2. Description of the Related Art

Conventional portable radio apparatuses employ a ferrite antenna, a small loop antenna, a plate-shaped loop antenna or the like. The reception efficiency of such an antenna is determined by a ratio of a wavelength of a used electric wave to an antenna length.

Thus, a portable radio apparatus which employs a loop antenna must be used at high frequencies. To allow the portable radio apparatus usable in, for example, a VHF bandwidth, the aperture area of the loop antenna must be increased, thus making a reduction in the size of the portable radio apparatus difficult. Where $\eta$ is the antenna efficiency, $\gamma rad$ is the radiation resistance and $\gamma loss$ is the antenna resistance, antenna efficiency $\theta$ is expressed by the following equation:

$$\eta=\gamma rad/(\gamma rad+\gamma loss) \quad (1)$$

Radiation resistance yrad is proportional to the square of the aperture area of the loop antenna. Antenna resistance $\gamma loss$ is proportional to the antenna length, and is inversely proportional to the surface area of an antenna member. Thus, to achieve a reduction in the aperture area of an antenna member and an increase in the antenna efficiency $\eta$ at the same time, the surface area of the antenna member must be increased, that is, restrictions are imposed on the shape of an antenna member, resulting in an increase in the width of the antenna member. If a wide loop antenna is accommodated in a casing having a curvedly bulging side surface, useless space is generated within the casing.

An antenna having a wide surface area is described in JP 1-34414. The surface of the loop antenna parallel to the aperture surface forms a vertical thick surface. Thus, it is apparent that accommodation of such a loop antenna in the above-described casing generates useless space therein.

In small portable radio apparatuses, a circuit board must be disposed near an antenna because the space in the casing is limited. In such a layout, the loop antenna is influenced by an electronic circuit on the circuit board, deteriorating the sensitivity thereof. Particularly, if a direct conversion type radio apparatus circuit is employed and since the frequency of a locally oscillated signal is almost equal to the reception frequency, the locally oscillated signal and the noise occurring in the locally oscillated signal interfere with radio transmission and reception between that radio apparatus and other radio apparatus. In order to eliminate such a problem in a small portable radio apparatus which employs a loop antenna, the antenna must be disposed at a position separated from the local oscillation circuit, or an effective shielding structure must be provided to suppress an electromagnetic radiation from the local oscillation circuit. Thus, the use of a loop antenna precludes a reduction in the size of the portable radio apparatus.

SUMMARY OF THE INVENTION

In view of the aforementioned problems of conventional radio apparatus, an object of the invention is to provide a portable radio apparatus employing a slot antenna member having an improved shape. This shape allows no useless space to be generated within a casing having a curvedly bulging side end surface when the slot antenna member is accommodated in the casing, so as to enable a reduction in the size thereof.

Another object of the invention is to provide a portable radio apparatus having an internal structure which is less influenced by the noise generated from a circuit board so as to enable the circuit board to be located near an antenna member and thereby enable a reduction in the size thereof.

To achieve the above-objects, the invention provides a portable radio apparatus in which a circuit board, which includes a radio apparatus circuit and a slot antenna member, are accommodated in a radio apparatus casing. The slot antenna member includes first and second conductive plates which are disposed in such a manner that the first and second conductive plates sandwich the circuit board. The slot antenna member has a slot groove at an outer side of the circuit board, and a shortcircuiting portion for short-circuiting the conductive plates over the slot groove. The radio apparatus casing has a side portion whose thickness reduces toward an outer periphery thereof. The first and second conductive plates have side portions which curve in such a manner that a distance between the conductive plates decreases toward outer peripheral edges thereof.

In another aspect of the invention, there is provided a portable radio apparatus in which a circuit board, which includes a radio apparatus circuit, and a slot antenna member are accommodated in a radio apparatus casing. The slot antenna member includes first and second conductive plates which are disposed in such a manner that the first and second conductive plates accommodate therein the circuit board. The slot antenna member has a slot groove at an outer side of the circuit board, and a shortcircuiting portion for short-circuiting the conductive plates over the slot groove. The portable radio apparatus casing has a semi-spherical external shape. The first and second conductive plates have a semi-spherical external shape.

In preferred embodiments, a tuning capacitor element is electrically connected to the first and second conductive plates providing a high antenna gain relative to the short slot groove. The tuning capacitor element connection is in a position opposite the position of the short-circuiting portion embodiment.

The first and second conductive plates, respectively, have opening portions at areas thereof which face the circuit board so that the noises generated from electronic parts on the circuit board is released from the opening portions.

A noise generating source, such as the circuit board or a local oscillating circuit of the direct conversion type radio apparatus circuit, is located at a position deviating from a central portion of the antenna member toward the short-circuiting portion.

When the radio apparatus circuit is a direct conversion type radio apparatus circuit, a high-frequency amplifying circuit of the radio apparatus circuit is electrically connected to the conductive plate located on a side of the circuit board which is opposite to a side thereof where the local oscillator circuit of the radio apparatus circuit is provided. The slot groove of the slot antenna member is filled with a dielectric material.

The portable radio apparatus is carried around with the tuning capacitor element connecting position between the first and second conductive plates up or down so that the center of the radiation of the antenna member is directed upward to increase a sensitivity.

An orthogonal transform mixer circuit and a base band signal detecting circuit of the direct conversion type radio apparatus circuit are in the same integrated circuit. The direct conversion type radio apparatus circuit is driven by power from a booster circuit for boosting an electric cell voltage. An operation frequency of the booster circuit is set by a crystal oscillator and is in a non-pass band of a base band signal filtering circuit included in the radio apparatus circuit.

The radio apparatus casing has a curled cord at a portion close to either the tuning capacitor element or the short-circuiting portion.

In the portable radio apparatus according to the invention, the radio apparatus casing has a side portion which bulges toward an outer periphery thereof. The first and second conductive plates, which include the slot antenna member, have side portions which bulge toward outer peripheral edges thereof and form a slot groove. The portable radio apparatus must be small because they are put in a pocket and carried around. The portable radio apparatus must also have good design and comfortable texture. Hence, the radio apparatus casing has a side portion which becomes thinner toward an outer periphery thereof so as to enhance the design and texture. Further, since the slot antenna has the bulging side portions, it can be disposed along the inner surface of the radio apparatus casing, thus eliminating useless space within the radio apparatus casing. As a result, a reduction in the size of the portable radio apparatus can be achieved.

BRIEF DESCRIPTION OF THE DRAWINGS

The invention will be described in detail with reference to the following drawings, wherein:

FIG. 1(*b*) is a side elevational view of the portable radio apparatus of FIG. 1(*a*);

FIG. 1(*c*) is a plan view of a portable radio apparatus having a curled cord on a radio apparatus casing;

FIG. 1(*d*) illustrates the portable radio apparatus of FIG. 1(*c*) hung from a human body;

FIG. 3(*b*) is a front view of the antenna member of FIG. 2;

FIG. 3(*c*) is a left side view of the antenna member of FIG. 2;

FIG. 3(*d*) is a right side view of the antenna member of FIG. 2;

FIG. 16(*b*) is a front view of the antenna member shown in FIG. 13;

FIG. 16(*c*) is a right side view of the antenna member of FIG. 13;

FIG. 18(*b*) is a perspective view of the antenna member of FIG. 17;

FIG. 18(*c*) is a plan view of the antenna member of FIG. 17;

FIG. 18(*d*) is a side view of the antenna member of FIG. 17;

FIG. 21(*b*) illustrates a portable radio apparatus employing another conventional slot antenna.

DETAILED DESCRIPTION OF THE PREFERRED EMBODIMENTS

Figure 1A:
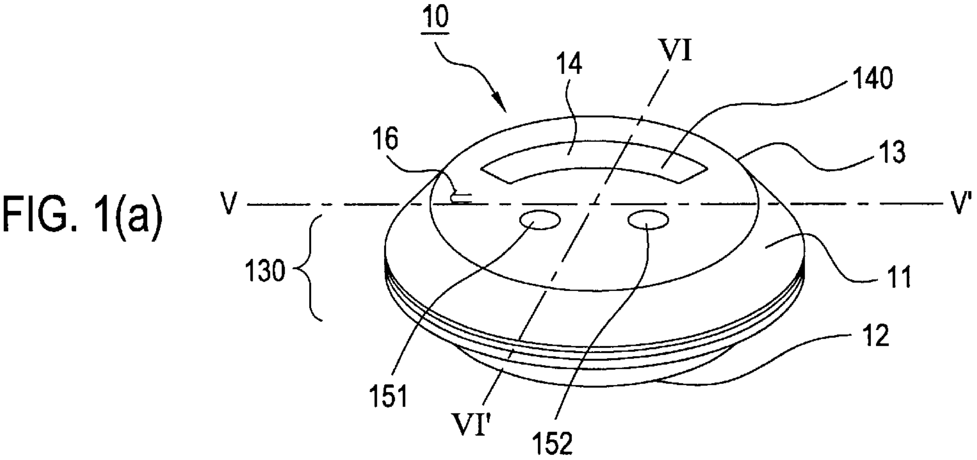
FIG. 1(*a*) is a perspective view of a first embodiment of a portable radio apparatus.
Figure 1B:
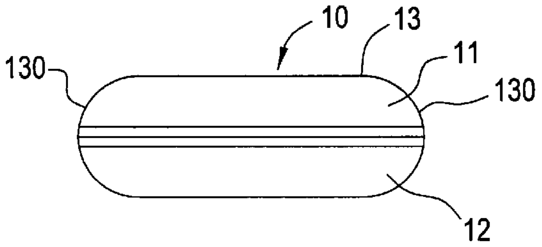
Figure 1C:
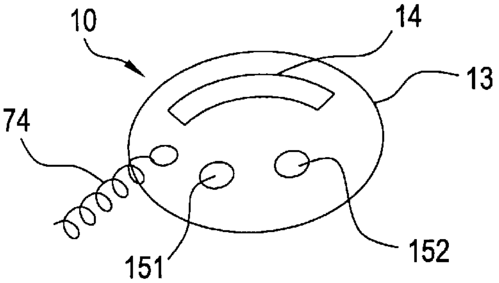
Figure 1D:
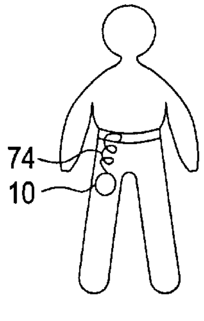

Embodiments of the invention will now be described with reference to the accompanying drawings. In each of the following embodiments, an antenna member is disposed in a casing forming a casing-incorporated portable apparatus, such as a pager.

First embodiment

FIG. 1(*a*) is an external perspective view of a first embodiment of a portable radio apparatus 10. FIG. 1(*b*) is a side elevational view of the radio apparatus 10 of FIG. 1(*a*).

In FIGS. 1(*a*) and l(*b*), the portable radio apparatus 10 employs a radio apparatus casing 13 which is formed by placing an upper casing member 11 on a lower casing member 12. The radio apparatus casing 13 has an elliptical form when viewed from above. The radio apparatus casing 13 has a side portion 130 which curvedly bulges toward an outer periphery thereof. Thus, design of the portable radio apparatus 10 is improved and the user can readily put the portable radio apparatus 10 in the pocket or take it out from the pocket. The reception contents are displayed on a liquid crystal display panel on the upper surface of the radio apparatus 13 so that the user can check them through a protective lens 140 incorporated in the upper casing member 11. Below the liquid crystal display panel 14 are disposed two operation buttons 151 and 152.

In order to indicate, to the user, which side of the portable radio apparatus 10 is up when the user puts the apparatus 10 in a pocket, an arrow mark 16 is provided on the upper casing member 11. The portable radio apparatus 10 is internally constructed such that it exhibits the maximum sensitivity when the mark 16 up or down. As shown in FIG. 1(*c*), a curled cord 74 may be provided at a position near the mark 16 in the place of the mark 16 so that the user can hang the radio apparatus 10 in the manner shown in FIG. 1(*d*) with the portion of the apparatus provided with the curled cord 74 up. Thus, the user can carry the portable radio apparatus 10 with a particular portion thereof up or down so that the portable radio apparatus 10 is directed in a direction which ensures the highest sensitivity when carried.

In the portable radio apparatus 10 having the above-described shape, a slot antenna is accommodated in the radio apparatus casing 13, because it has a shape which matches the internal shape of the radio apparatus casing 13 and because it is not readily affected by an electronic circuit. The structure of this slot antenna will be described below with reference to FIGS. 2 to 4.

Figure 2:
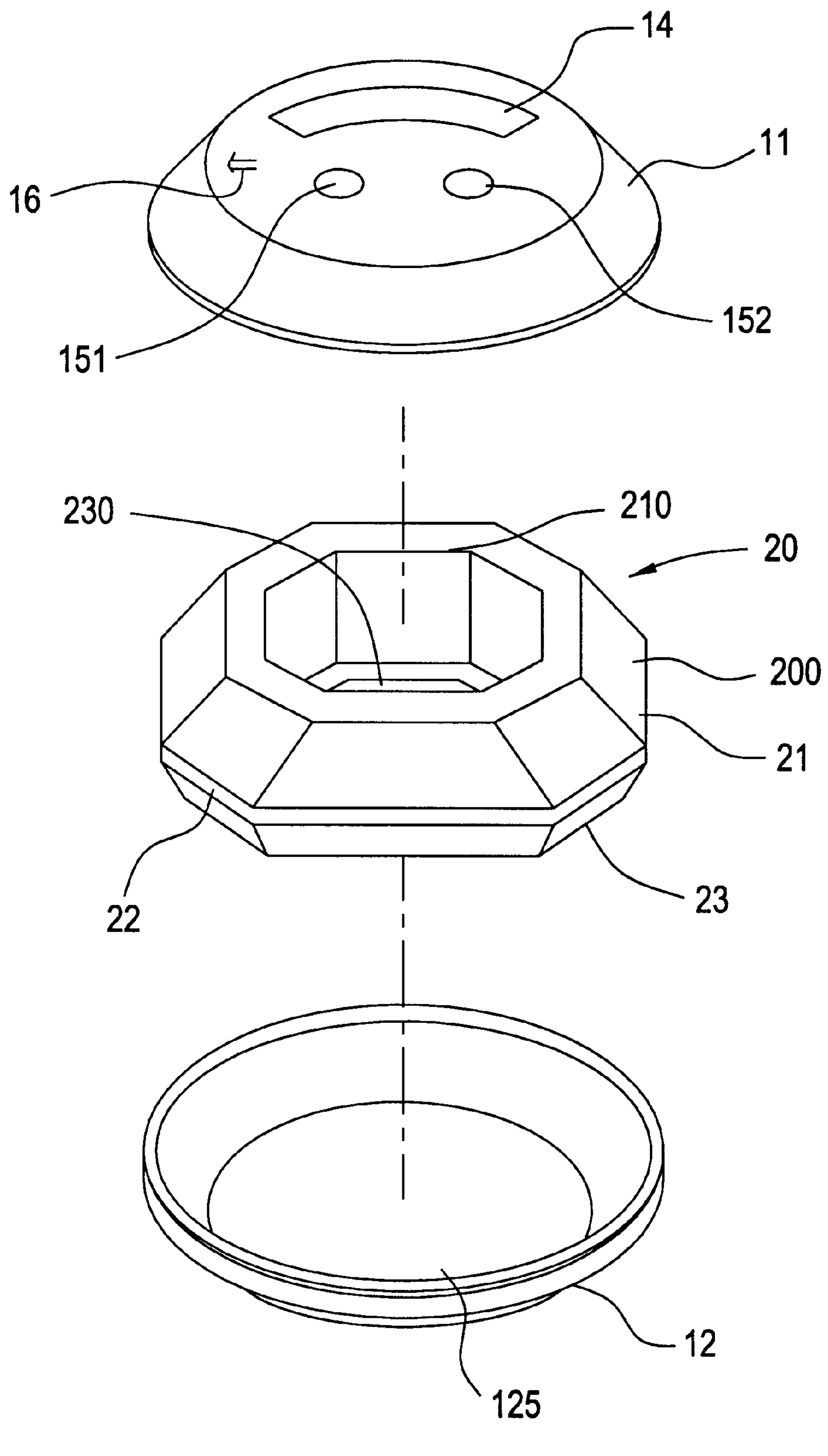
FIG. 2 is an exploded perspective view of the portable radio apparatus of FIG. 1(*a*)
Figure 3A:
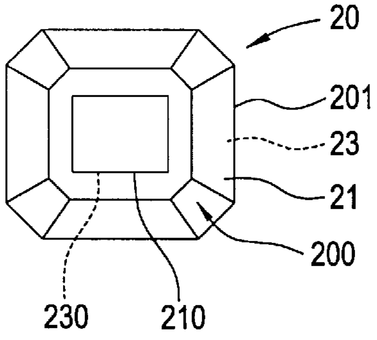
FIG. 3 (*a*) is a plan view of an antenna member of FIG. 2.
Figure 3C:
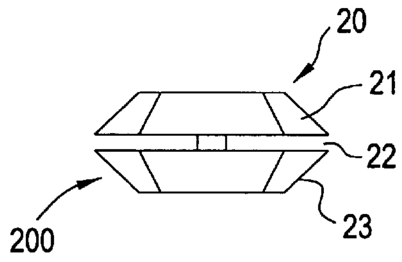
Figure 3B:
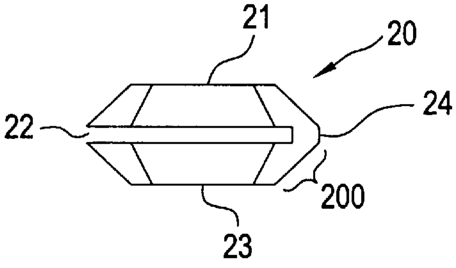
Figure 3D:
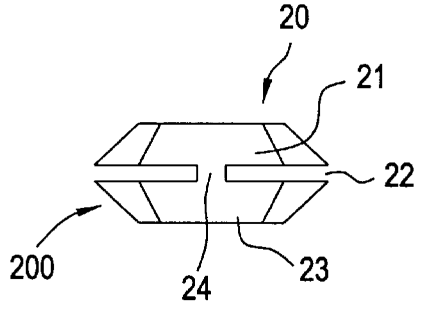
Figure 4:
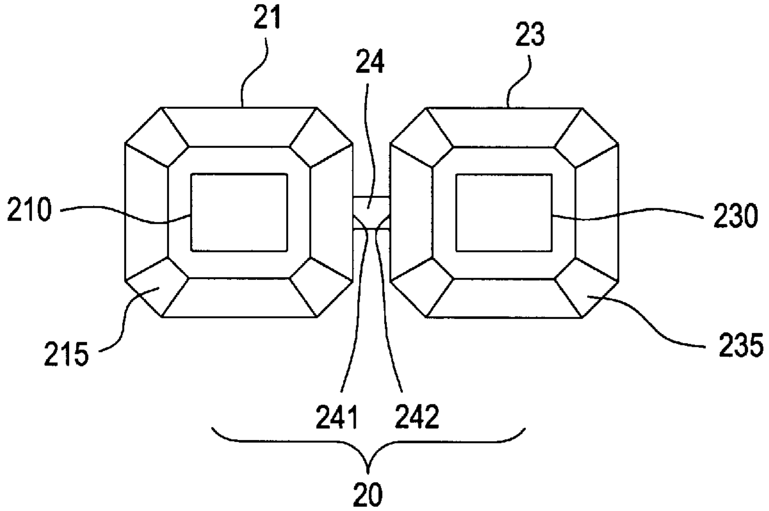
FIG. 4 is an expansion plan view of the antenna member shown in FIG. 2.

FIG. 2 is an exploded perspective view of the first embodiment of the portable radio apparatus. FIG. 3(*a*) is a plan view of an antenna member. FIG. 3(*b*) is a front view of the antenna member. FIG. 3(*c*) is a left side elevational view of the antenna member. FIG. 3(*d*) is a right side elevational view of the antenna member. FIG. 4 is an expansion plan view of the antenna member.

In FIG. 2, an antenna member 20, which is a slot antenna member, is accommodated between the upper casing member 11 and the lower casing member 12. The antenna member 20 has a shape which matches the shape of the interior of the upper and lower casing members 11 and 12. That is, the entire shape of the antenna member 20 is hexagonal, as shown in FIG. 3(*a*), and the antenna member 20 has a side portion 200 which slantingly bulges toward the outer peripheral edge thereof, as shown in FIGS. 3(*b*) to 3(*d*). The antenna member 20 includes a first conductive plate 21 constituting an upper half portion, a second conductive plate 23 which is cupped over the first conductive plate 21 in such a manner that a slot groove is formed on an outer periphery thereof, and a short-circuiting portion. 24 for electrically short-circuiting the first and second conductive plates 21 and 23. The first and second conductive plates 21 and 23 have square opening portions 210 and 230 on their surfaces, respectively.

In the antenna member 20, the first and second conductive plates 21 and 23 and the short-circuiting portion 24 are formed as one unit, as shown in FIG. 4. The antenna member 20 shown in FIG. 3 is obtained by bending at both a coupling portion 241 between the short-circuiting portion 24 and the first conductive plate 21 and a coupling portion 242 between the short-circuiting portion 24 and the second conductive plate 23. At that time, the side portion 200 of the antenna member 20 is constituted by side portions 215 and 235 which respectively bulge slantingly toward outer peripheral edges thereof in the first and second conductive plates 21 and 23.

Figure 5:
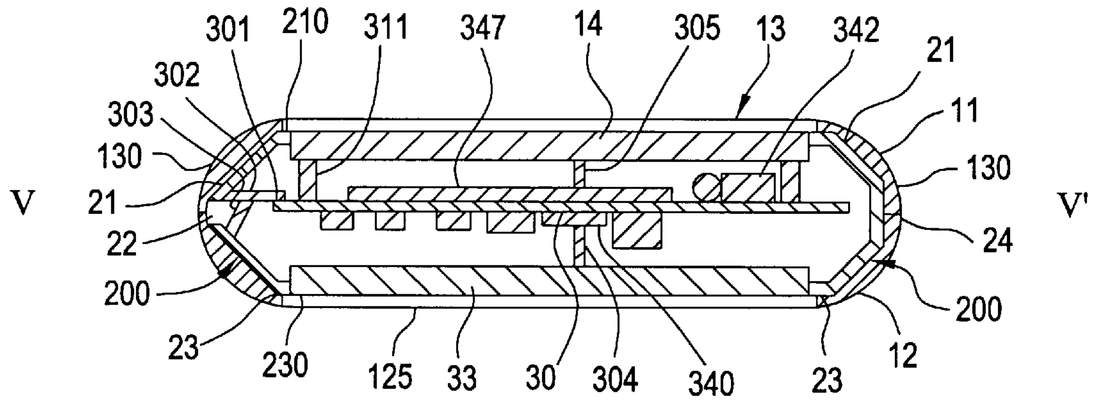
FIG. 5 is a section taken along the line V—V' of FIG. 1(*a*)
Figure 6:
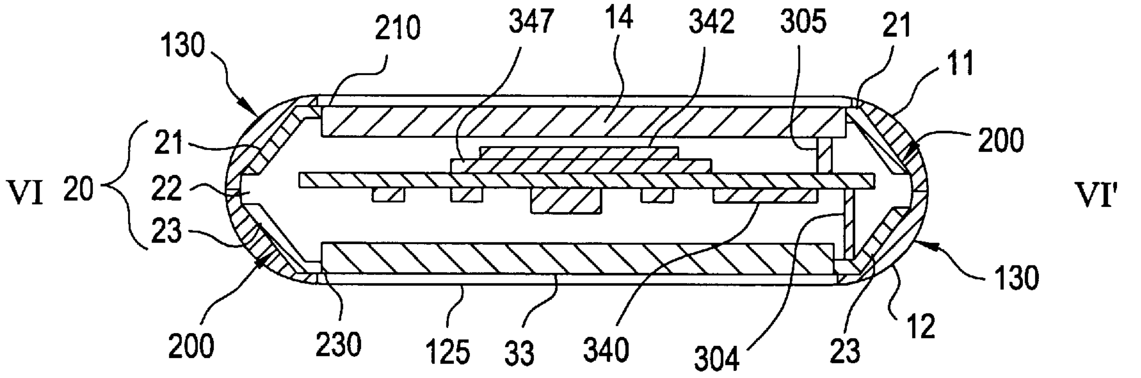
FIG. 6 is a section taken along the line VI—VI' of FIG. 1(*a*)

FIG. 5 is a section taken along the line V—V' of FIG. 1. FIG. 6 is a section taken along the line VI—VI of FIG. 1. When the portable radio apparatus 10 is manufactured using the antenna member 20 having the above-described structure, the antenna member, 20, a circuit board 30 constituting a radio apparatus circuit, the liquid crystal display panel 14, an electric cell 33 and so on are accommodated in the radio apparatus casing 13, as shown in FIGS. 5 and 6.

As shown in FIGS. 5 and 6, since the antenna member 20 has the bulging side portion 200, it is disposed within the casing 13 along the inner surfaces of the upper and lower casing members 11 and 12, thus substantially eliminating useless space within the side portion 130 of the radio apparatus casing 13.

The circuit board 30 constituting the radio apparatus circuit is sandwiched between the first and second conductive plates 21 and 23. The slot groove 22 of the antenna member 20 is located on the outer side of the circuit board 30. On the front side of the circuit board 30 is located the opening portion 210 of the first conductive plate 21. Thus, the user can see the data displayed by the liquid crystal display panel 14 through the opening portion 210. On the rear side of the circuit board 30 is located the opening portion 230 of the second conductive plate 23. Thus, the user can replace the button type electric cell 33, serving as a power source of the portable radio apparatus 10, with a new one through the opening portion 230 by removing a rear lid 125 of the lower casing member 12.

Figure 7:
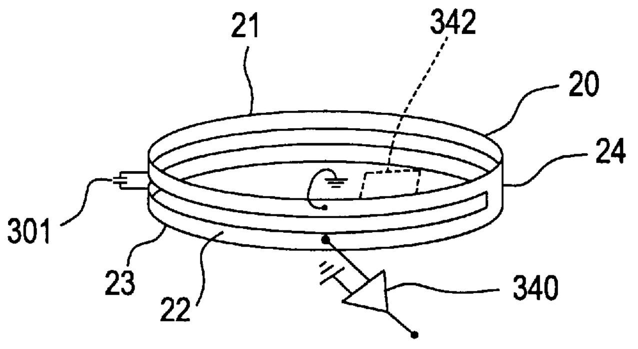
FIG. 7 is an equivalent circuit diagram of the antenna member shown in FIG. 2.

At a position on the side of the V' direction with respect to the circuit board 30, the short-circuiting portion 24 extends over the slot groove 22 to electrically short-circuit the first and second conductive plates 21 and 23. On the V direction side of the circuit board 30 is mounted a tuning capacitor element 301 which is electrically connected to both the first and second conductive plates 21 and 23 through terminals 302 and 303, respectively. The connecting position of the tuning capacitor element 301 is opposite to the short-circuiting position of the first and second conductive plates 21 and 23 by the short-circuit portion 24, as shown in FIG. 7 which is an equivalent circuit diagram of the antenna member 20.

The tuning capacitor element 301 enables the antenna member 20 to tune at a high antenna gain even if the length of the slot groove 22 is shorter than the length corresponding to half an used frequency. Thus, location of the tuning capacitor element 301 at a central position in the longitudinal direction of the slot groove 22, i.e., at a position remotest from the short-circuiting portion 24, is the most effective. The vicinity of the connecting position of the tuning capacitor element 301 with the antenna member 20 constitutes a high impedance portion of the antenna member 20 from which electromagnetic waves are radiated. Thus, when the user carries the portable radio apparatus 10 around, he or she puts the portable radio apparatus 10 in a pocket with the connecting position between the tuning capacitor element 301 and the antenna member 20 up or down so as to obtain the highest sensitivity. The direction in which the portable radio apparatus 10 is directed during use is indicated by the arrow mark 16 on the upper casing member 11.

Figure 8A:
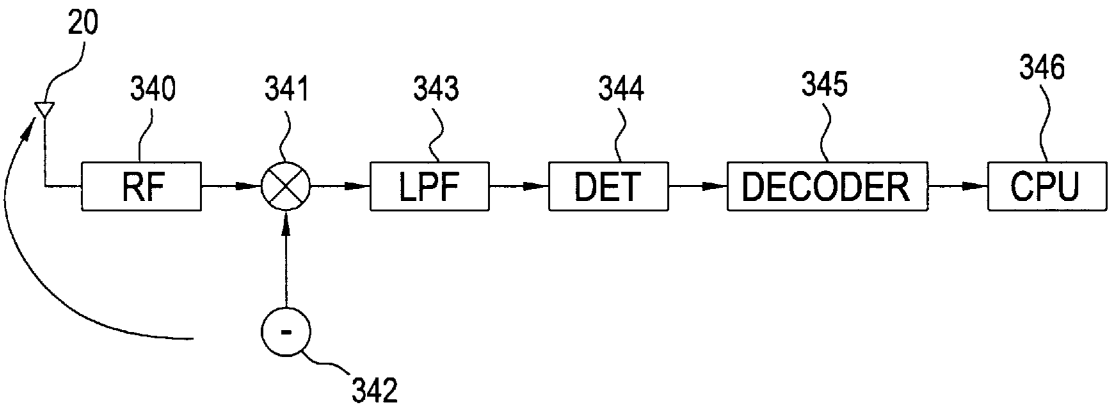
FIGS. 8(*a*) and 8(*b*) are block diagrams of a direct conversion radio apparatus circuit.
Figure 8B:
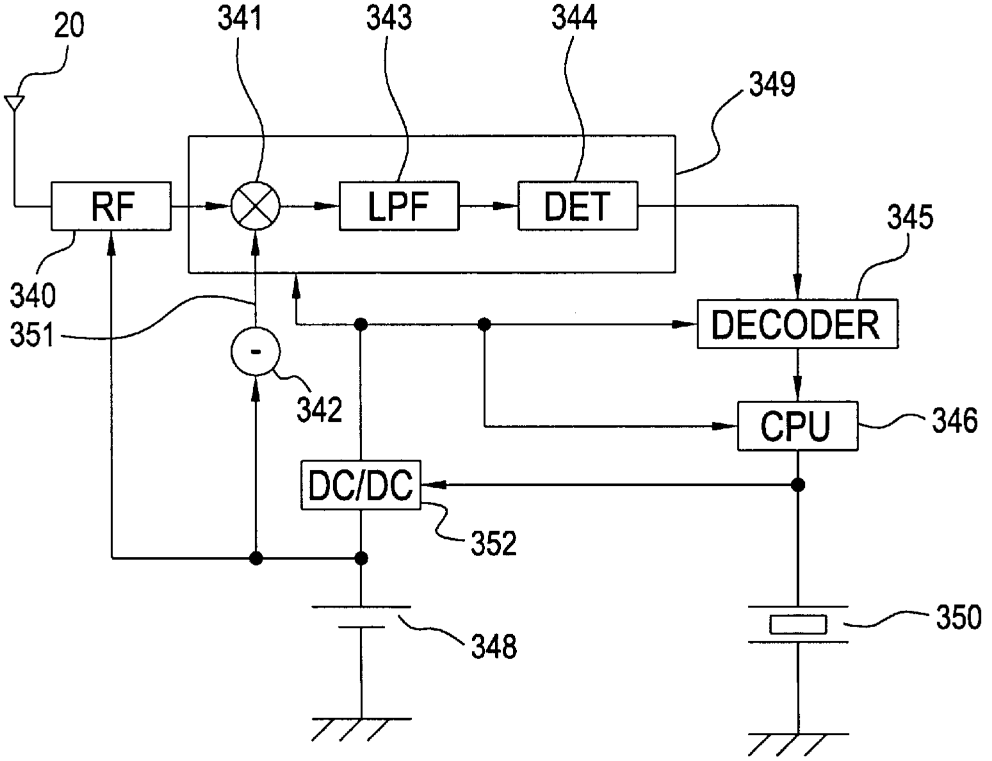

In this embodiment, the portable radio apparatus circuit constituted by the circuit board is the direct conversion type. FIG. 8(*a*) is a block diagram of such a portable radio apparatus circuit.

In FIG. 8(*a*), an RF amplifier 340 (high-frequency amplifying circuit), a mixer 341, a local oscillator 342 (local oscillating circuit), a low-pass filter 343, a detector 344, a decoder 345 and a CPU 346 are constituted with respect to the antenna member 20. Unlike the single superheterodyne type radio apparatus circuit, conversion into an intermediate frequency cannot be performed. That is, in the direct conversion type radio apparatus circuit, since the tuning frequency matches the oscillation frequency of the local oscillator 342, a local oscillated signal of the local oscillator 242 readily supplies the antenna member 20, suppressing a received signal or interfering with other radio apparatus. Further, the operation clock of a booster circuit supplies through a power line as noise which occurs in an oscillated signal. If the frequency of the operation clock, which generally ranges from ten Khz to several Mhz, is very low and if the signal-to-noise (S/N) ratio of the clock oscillation is not good, the side band noise of the operation clock supplies from the antenna member 20, passes through the RF circuit and the mixer circuit, and is then converted into base band noise in the direct conversion detector circuit output, thus reducing the S/N ratio of a signal.

Figure 21A:
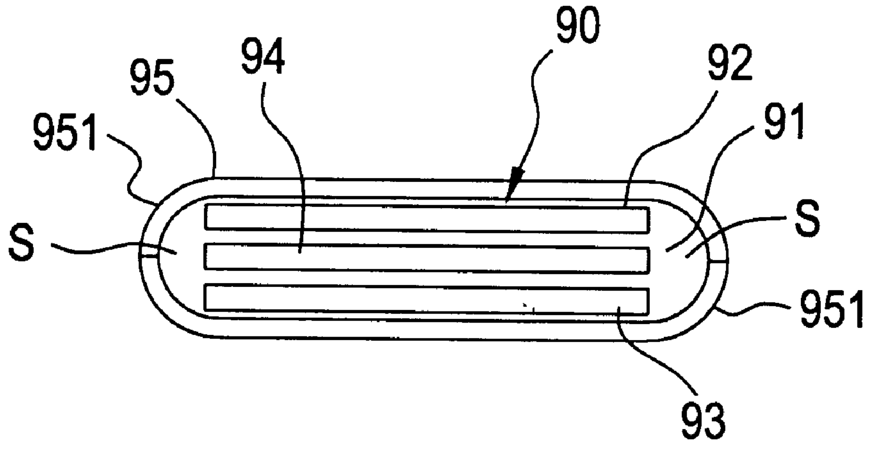
FIG. 21(*a*) illustrates a portable radio apparatus employing a conventional slot antenna.
Figure 21B:
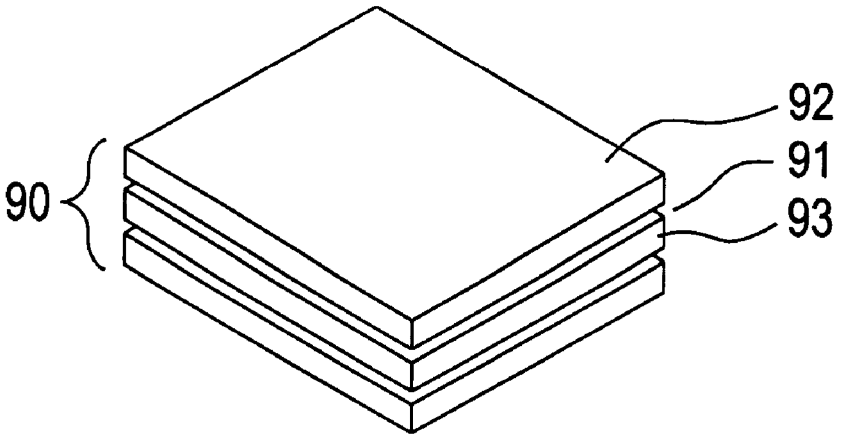

Furthermore, as shown in FIG. 21(*b*), in slot antenna member 90 in which two conductive plates 92 and 93 are laid on top of the other in such a manner that a slot groove 91 is formed at outer peripheral positions thereof, the slot antenna member 90 receives noise from a circuit board 94 superimposed on the conductive plates, thus reducing the sensitivity thereof.

To avoid such a deficiency, in the direct conversion type radio apparatus circuit, the antenna member 20 and the local oscillator 342 must be disposed at positions separated from each other. However, in a small portable radio apparatus 10, such as that of this embodiment, it is generally impossible to obtain such a layout.

Further, it is also necessary to provide means of eliminating mixture of the side band noise of the operation clock of the booster circuit.

Hence, in this embodiment, the local oscillator 342 is mounted on the front side of the circuit board 30 at a position deviating from the center of the antenna member 20 in the V' direction, i.e., at a position close to the short-circuiting portion 24, in a state wherein it is placed in a shielding box, as shown in FIG. 5, so that the local oscillator 342 can be located at a position which does not readily influence the antenna member 20. Accordingly, the local oscillator 342 is at a position remote from the connecting position between the tuning capacitor element 301 and the antenna member 20 (which is the highest impedance portion in the antenna member 20) where the antenna member 20 is least influenced by the noise from the local oscillator 342. On the front side of the circuit board 30 is mounted the digital IC 347 functioning as the decoder 345 and the CPU 346, and so on. However, an influence of the digital IC 347 on the antenna member 20 is relatively small, and there is thus no limitation on the position of the digital IC 347.

Regarding the problem involving the occurrence of the side band noise of the operation clock of the booster circuit in the locally oscillated signal, mixture of the side band noise into the antenna member 20 can be eliminated when the above-described layout is obtained. If the operation clock is set in a non-pass band of the low-pass filter and if the clock oscillation is a crystal oscillator, mixture can be more reliably eliminated. The amount of attenuation by the low-pass filter 343 at about 32.768 Khz is 90 Db or above. This, together with high Q of the crystal oscillator 350, can sufficiently attenuate the operation clock and the side band noise.

FIG. 8(*b*) is a block diagram of the radio apparatus circuit with a power source line. The electric cell 348 is a dry cell or air cell of 1.5 volts or below. A power of 2 volts or above is necessary to operate a direct conversion IC 349. Hence, the voltage of the electric cell 348 is boosted by a DC/DC converter 352. A voltage boosting method is the charge pumping method by a reactance element. A crystal oscillator 350 is used as a reference signal source used to store and discharge electric charges. The crystal oscillator, having a frequency ranging from about 32.768 Khz to about 76.8 Khz, is also used as a reference signal for clock operation or data demodulation in the CPU.

In the structure shown in FIG. 8(*b*), the local oscillator 342 is independent, and the mixer 341 is within the IC. In this structure, a signal line 351 is an exposed printed pattern on the board or the like. The signal intensity on the signal line 351 at a 50 Ω terminal is between −10 dBm and −20 Dbm, and the impedance of the signal line 351 is several kΩ. Thus, an externally radiating level is very high, and radiation takes place in upward and downward directions of the signal line 351. Particularly, in a small and thin radio apparatus having a structure in which the signal line 351 is covered by a loop antenna, the local oscillating circuit 342 radiates intense radiations. The inventors measured and found that the radiated electric field level at the input terminal of the RF amplifier 340 is 110 Db$\mu$V. The minimum reception electric field level of the portable radio apparatus 10 is between 10 Db$\mu$V and 15 Db$\mu$V. Thus, the reception signal wave is distorted and suppressed at either the RF amplifier 340 or the mixer 341 due to disturbance by an electric wave discharged by that radio apparatus and higher by 100 Db than the reception electric field level.

Further, the level of side band noise occurring in the oscillating signal increases in proportion to the electric field level, and appears as base band noise, deteriorating the S/N ratio of the reception signal wave.

This embodiment assures good performance even in a portable radio apparatus having the above-described circuit configuration.

In the structure shown in FIG. 8(*b*), since the antenna member 20 and the above-described layout are employed, the radiated electric field level at the input terminal of the RF amplifier 340 reduces to 80 Db$\mu$V. Thus, reception signal wave is not suppressed and the side band noise level is reduced, thus increasing the S/N ratio. The same effect can be obtained in a structure other than the structure shown in FIG. 8(*b*) if the local oscillator 342 and the mixer 341 are formed as a shielded single unit so that the output signal of this unit can be a base band signal and if the low-pass filter 343 and the detector 344 are provided on separate ICs.

If a power supply circuit or a reception circuit electrically connected to the antenna member 20 is a balanced circuit, the RF amplifier 340 is connected to both the first and second conductive plates 21 and 23 over the slot groove 22. If the power supply circuit or the reception circuit is an unbalanced circuit, the RF amplifier 340 is connected to either the first conductive plate 21 or the second conductive plate 23. In the present embodiment which employs such an unbalanced power supply, the local oscillator 342, which is a noise generation source, is mounted on the front side of the circuit board 30 so that the noise from the local oscillator 342 can be extracted through the opening portion 210 of the first conductive plate 21, and the RF amplifier 340 is connected to the second conductive plate 23 through a connector 304 while a grounded voltage is applied to the first conductive plate 21 through a connector 305, as shown in FIG. 6, so as to reduce an influence of the noise from the local oscillator 342. Hereon, the connecting position (power supplying point) of the RF amplifier 340 to the second conductive plate 23 is shifted from the connecting position of the tuning capacitor element 301 which indicates the highest impedance in order to simplify impedance matching between the antenna member 20 and the RF amplifier 340. The connecting position between the RF amplifier 340 and the antenna member 20 and the position of the local oscillator 342 are shown in FIG. 7.

In the portable radio apparatus 10 arranged in the manner described above, since a slot antenna is used as the antenna member 20, a magnetic field component is detected. Further, the portable radio apparatus 10 is suitable for use as a pager, because an antenna gain increases due to the image effect of a human body when the portable radio apparatus 10 is placed in a chest pocket.

The inventors have proposed the use of a slot antenna in the portable radio apparatus, such as a pager. However, even with a slot antenna, it is difficult to achieve a reduction in the size of the portable radio apparatus. In FIG. 21(*a*), when a slot antenna member 90 has a structure in which a circuit board 94 is sandwiched between two conductive plates 92 and 93 having a slot groove 91 on outer peripheral positions thereof, too large a space (slot groove) is generated between the conductive plates 92 and 93. Further, if the slot antenna member 90 is accommodated in a radio apparatus casing 95 having a curvedly bulging side end surface 951, useless space S is generated within the casing 95.

In the portable radio apparatus 10, the side portion 200 of the antenna member 20 slantingly bulges toward an outer periphery thereof so that it matches the shape of the side portion 130 of the radio apparatus casing 13 which curvedly bulges toward an outer periphery thereof. Thus, the antenna member 20 can be packed in the casing 13 along the inner surface of the side portion 130 of the radio apparatus casing 13, eliminating useless space within the radio apparatus casing 13. Consequently, a reduction of the size of the portable radio apparatus 10 can be achieved while a high degree of freedom is assured in the design of the portable radio apparatus 10.

Furthermore, since the antenna member 20 has the opening portions 210 and 230, the noise generated from the circuit board 30 escape from the opening portions 210 and 230, that is, the noise does not readily supply the antenna member 20. It is possible to dispose the liquid crystal display panel 14 utilizing the opening portion 210. Further, in this embodiment, since the local oscillator 342 is disposed near a low impedance position on the antenna member 20, the noise generated from the local oscillator 342 does not readily supply the antenna member 20. Thus, in a direct conversion type portable radio apparatus 10, even if the local oscillator 342 is disposed near the antenna member 20, an influence of the noise generated by the local oscillator 342 can be reduced. As a result, a reduction in the size can be achieved while a high sensitivity is maintained.

In the case of a slot antenna structure disclosed in JP 60-239106, the above-described effect cannot be obtained if the structure excluding the antenna is the same as that of this invention. Also, it is difficult to obtain the design shown in FIG. 1.

In this embodiment, a dielectric material (glass-epoxy resin) fills the slot groove 22 of the antenna member 20. In such an antenna member 20, a reception signal is shortened in proportion to the square root of a dielectric constant of the dielectric material filled in the slot groove 22. This is equivalent to the effective length of the antenna member 20 being extended. In such a state, even if the antenna member 20 is small and thin, signals having long wavelengths can be received. In contrast, if the wavelengths of the signals are the same, the antenna member 20 (the portable radio apparatus 10) can be made small and thin.

Whereas the preferred embodiment is shown such that the local oscillator 342, which is the major noise generation source, is disposed at a position deviating from the central portion of the antenna member 20 toward the short-circuiting portion 24 in order to suppress an influence from the electronic parts mounted on the circuit board 30, it is desirable that the other noise generation sources be also disposed at positions deviating toward the short-circuiting portion 24. Furthermore, in a case where the circuit board 30 is relatively small, the circuit board 30 itself may be disposed at a position deviating from the central portion of the antenna member 20 toward the short-circuiting portion 24.

The reception sensitivity of the portable radio apparatus 10 will now be described with reference to FIGS. 9 to 12.

Figure 9:
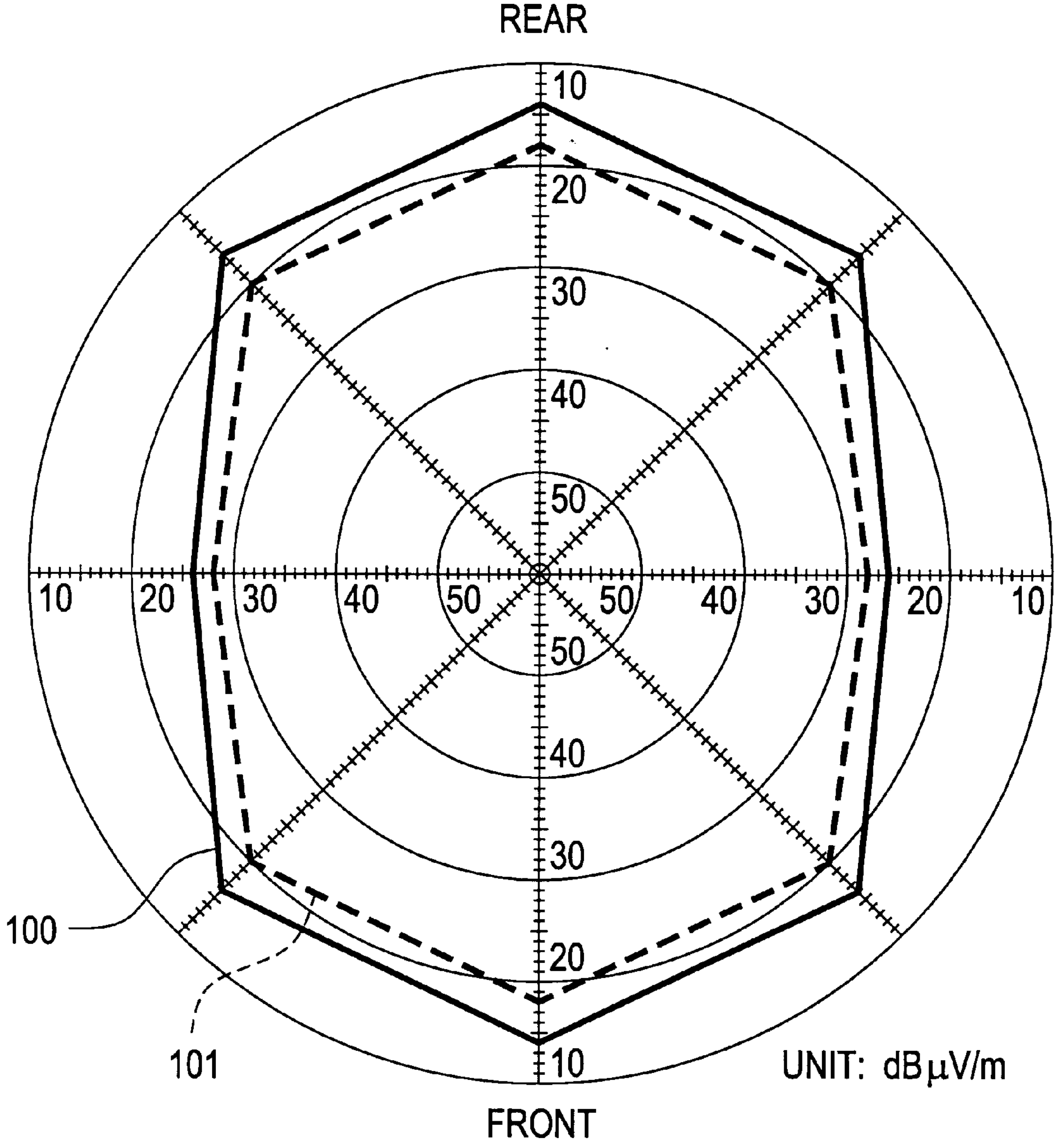
FIG. 9 is a comparison between the reception sensitivity of a portable radio apparatus of the first embodiment and that of a conventional slot antenna.

In FIG. 9, a bearing characteristic 101 indicates the reception sensitivity of a single portable radio apparatus which employs a slot antenna shown in FIG. 7 in which the conductive plates 21 and 23 are formed vertically. A bearing characteristic 100 indicates the reception sensitivity of a single portable radio apparatus which employs the antenna member 20 according to the present embodiment in which the conductive plates 21 and 23 form the side portion 200, a shown in FIG. 2 (*b*). In both cases, the entire length of the antenna member 20 is about 150 mm, and the reception frequency is about 280 Mhz. In the bearing characteristic 100, the best value is 14 Db$\mu$B/m, which is better by 3 Db to 4 Db than the best value of the bearing characteristic 101. If such an improvement is to be obtained with a conventional loop antenna, the opening area must be increased, thus precluding a reduction in the size of the radio apparatus. In contrast, in this embodiment, since a useless space S shown in FIG. 21 can be utilized effectively, excellent characteristics can be obtained while a reduction in the size can be achieved.

Figure 10:
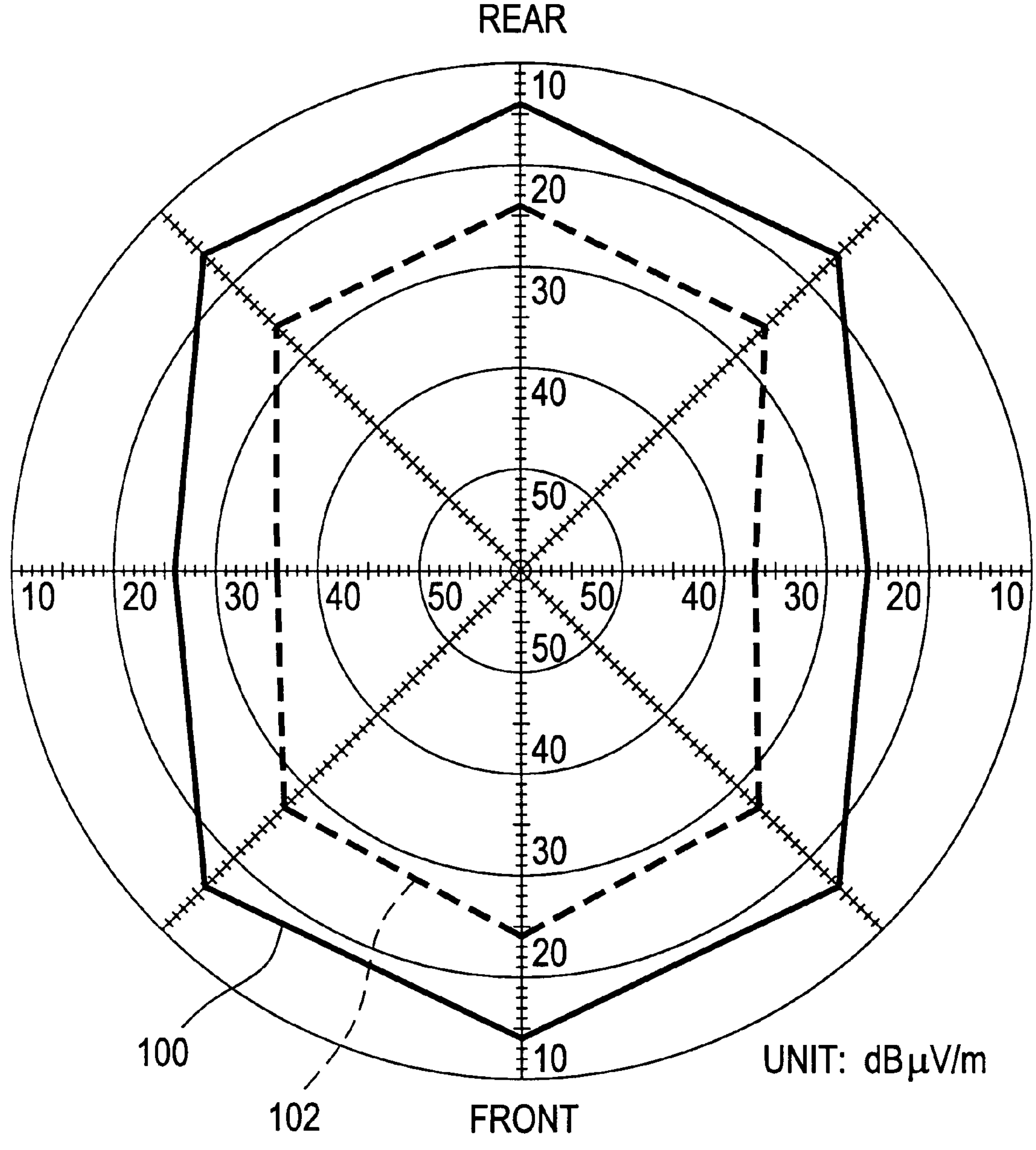
FIG. 10 is a comparison between the reception sensitivity of a portable radio apparatus having a local oscillator layout structure of the first embodiment and that of a comparative example.

In FIG. 10, a bearing characteristic 100 indicates the reception sensitivity of a single portable radio apparatus according to the invention in which the local oscillator 342 is disposed at a position deviating from the center of the antenna member 20 in the V' direction, as shown in FIG. 5, and a bearing characteristic 102 indicates the reception sensitivity of a single portable radio apparatus in which the local oscillator 342 deviates in the opposite direction to the V' direction. The difference between the bearing characteristics 100 and 102 is about 10 Db. This indicates that the reception sensitivity is affected by the layout. In a slot antenna, the vicinity of the short-circuiting portion 24 has the lowest impedance. Thus, even if noise is radiated from the local oscillator 342 from that vicinity, a level of noise which supplies the antenna member 20 is small.

Figure 11:
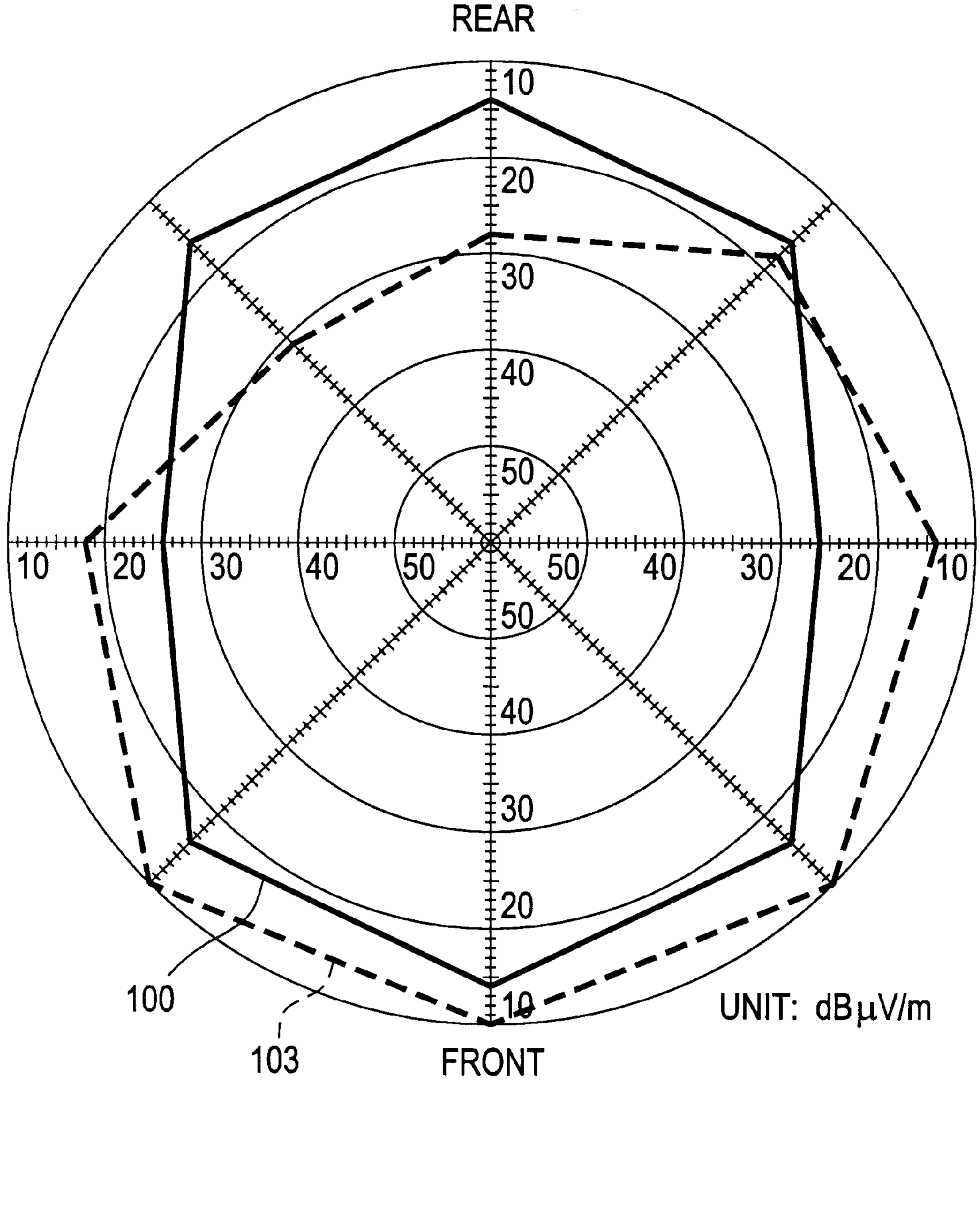
FIG. 11 is a comparison between the reception sensitivity of a portable radio apparatus of the first embodiment and when the portable radio apparatus is put on a human body.

In FIG. 11, a bearing characteristics 100 indicates the reception sensitivity of a single portable radio apparatus 10 in which the antenna member 20 is disposed, and a bearing characteristic 103 indicates the reception sensitivity of that portable radio apparatus 10 put on a human body. How the portable radio apparatus 10 is put on the human body is illustrated in FIG. 1(*d*). When the portable radio apparatus is put on the front of a human body, the sensitivity improved by about 4 Db. This indicates that the antenna member 20 according to this embodiment detected the magnetic field component, like a loop antenna.

Figure 12:
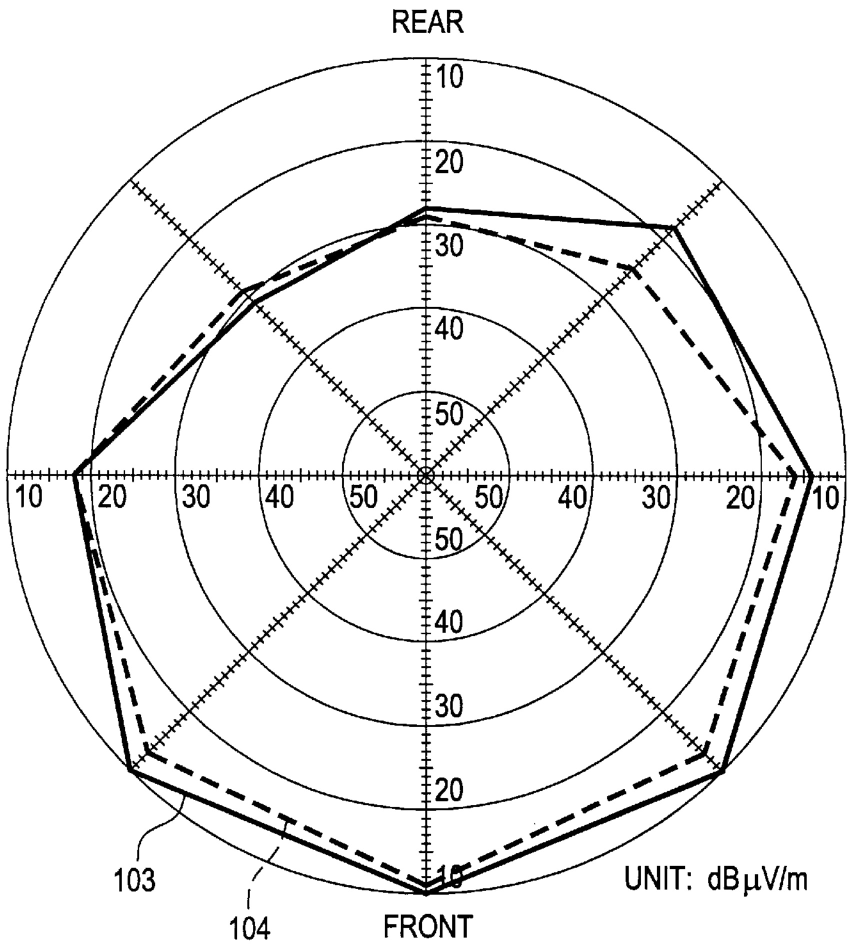
FIG. 12 is a comparison between the reception sensitivity of a portable radio apparatus of the first embodiment disposed on a human body and that of a superheterodyne portable radio apparatus of a conventional loop antenna on a human body.

In FIG. 12, a bearing characteristic 103 indicates the reception sensitivity of the portable radio apparatus 10 according to the present embodiment which employs the antenna member 20 when the portable radio apparatus 10 is put on a human body, and a bearing characteristic 104 indicates the reception sensitivity of a conventional super-heterodyne type portable radio apparatus which employs a loop antenna when the radio apparatus is put on a human body. In these portable radio apparatus, the reception sensitivity was almost the same, and 10 Db$\mu$V/m. In the superheterodyne type radio apparatus, the frequency of a local oscillated signal differs from the reception frequency by, for example, 455 Khz or 10 Mhz. Thus, an influence of a locally oscillated signal on its and other radio apparatus can be eliminated, and the bearing characteristics 104 can thus be readily obtained, even if the loop antenna is used. In the direct conversion type portable radio apparatus according to the present embodiment, since the antenna member 20 is optimally disposed, the above-described problem can be solved, a portable radio apparatus can be designed in the manner shown in FIG. 1, and the characteristics equivalent to those of a conventional superheterodyne type radio apparatus can be obtained.

Second Embodiment

Figure 13:
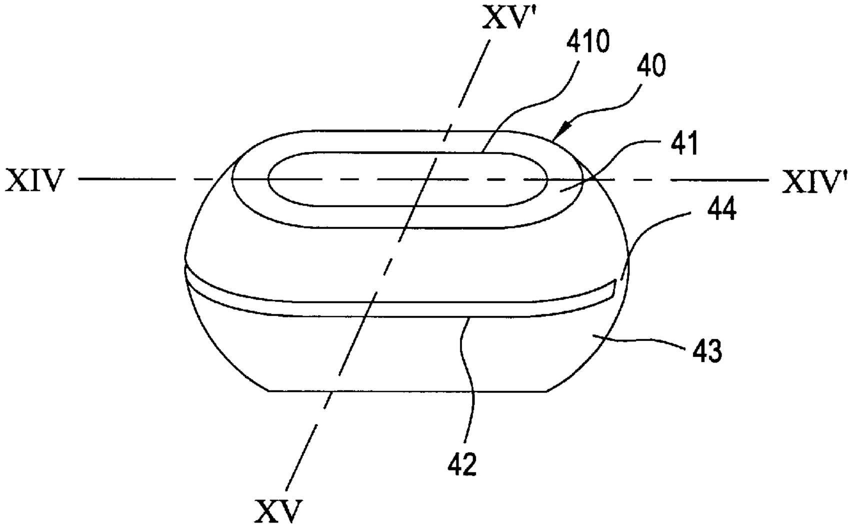
FIG. 13 is a perspective view of an antenna member incorporated in a second embodiment of the portable radio apparatus.

Whereas the first embodiment is structured such that the side portion 200 of the antenna member 20 slantingly bulges toward an outer periphery thereof so that it matches the shape of the side portion 130 of the radio apparatus casing 13 which curvedly bulges toward an outer periphery thereof, a second embodiment is constructed such that a side portion 400 of an antenna member 40, which is a slot antenna member, curvedly bulges toward an outer periphery thereof in the same manner as the radio apparatus casing 13 having the same shape as that of the first embodiment, as shown in FIG. 13.

Figure 14:
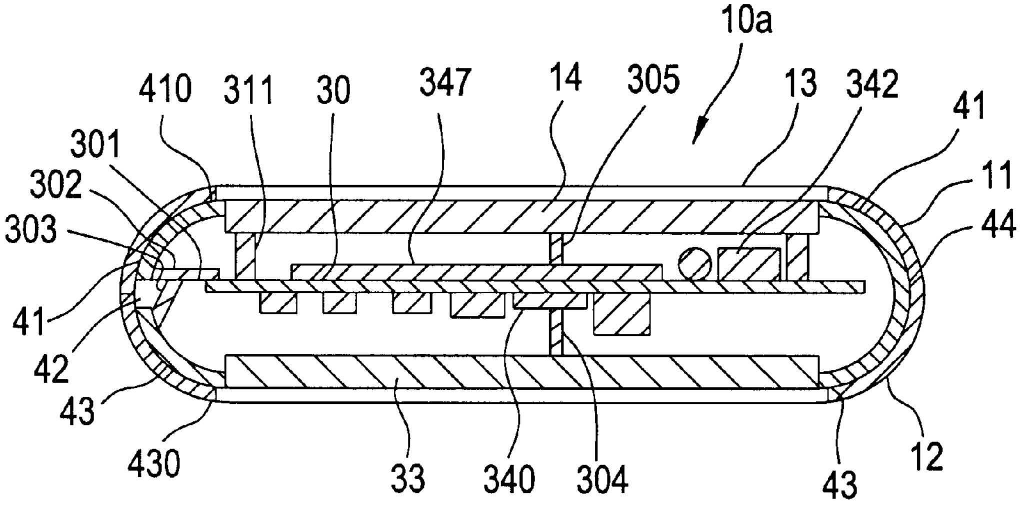
FIG. 14 is a section taken along the line XIV—XIV' of FIG. 13.
Figure 15:
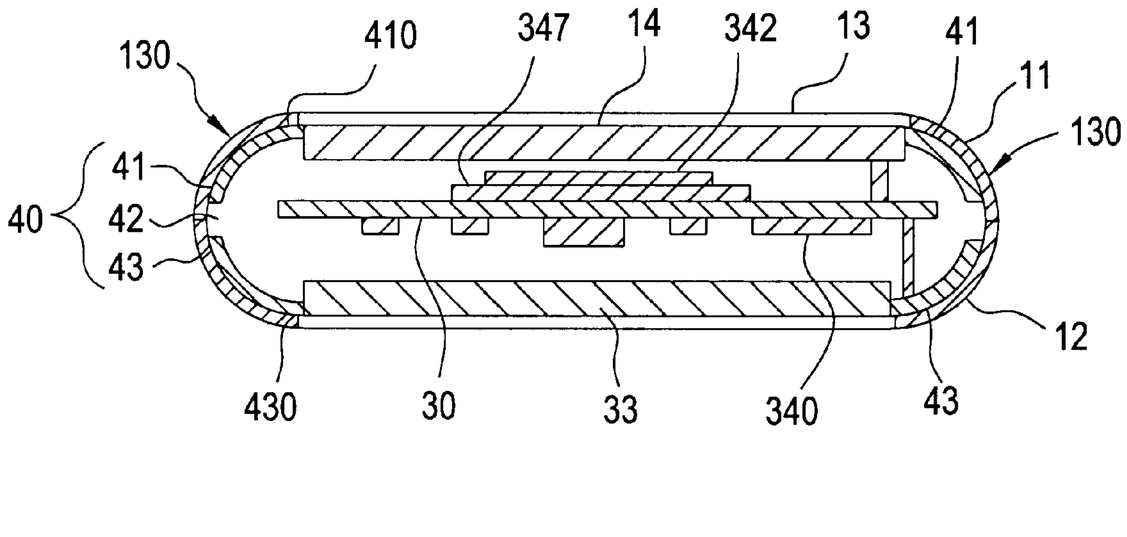
FIG. 15 is a section taken along the line XV—XV' of FIG. 13.

The side portion 400 of the antenna member 40 is closely attached to the inner surface of the side portion 130 of the radio apparatus casing 13, as shown in FIGS. 14 and 15, and thus there is substantially no space between the antenna member 40 and the casing 13.

Figure 16A:
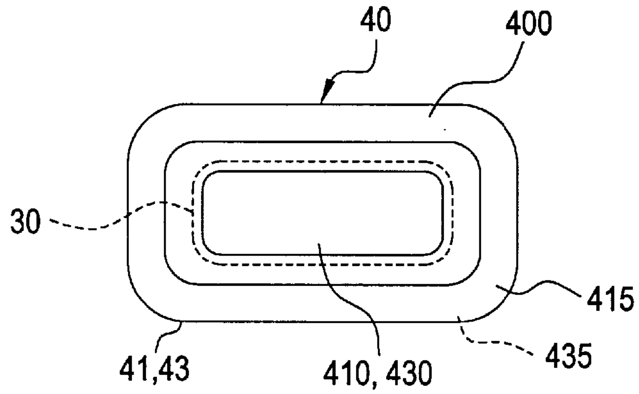
FIG. 16(*a*) is a plan view of the antenna member shown in FIG. 13.
Figure 16B:
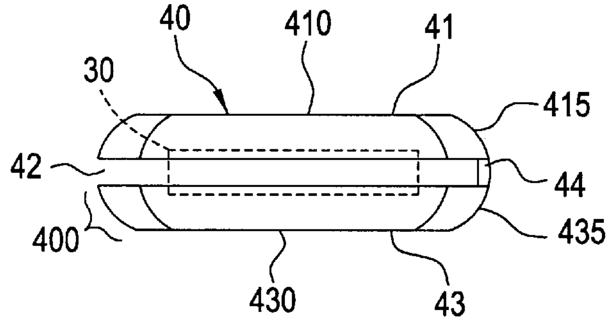
Figure 16C:
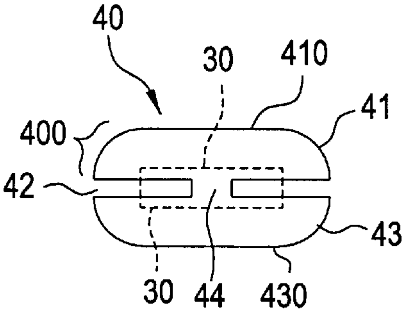

In a portable radio apparatus 10*a* employing the antenna member 40, the circuit board 30, constituting the radio apparatus circuit, and the display panel 14 are disposed within the radio apparatus casing 13. The display panel 14 is disposed on the front side of the circuit board 30. As shown in FIGS. 16(*a*) to 16(*c*), the antenna member 40 includes first and second conductive plates 41 and 43 which sandwich the circuit board 30 and constituting a slot groove 42 on the outer side of the circuit board 30, and a short-circuiting portion 44 for electrically short-circuiting the first and second conductive plates 41 and 43. The side portion 400 of the antenna member 40 is constituted by side portions 415 and 435 of the first and second conductive plates 41 and 43 which curvedly bulge toward outer peripheral edges thereof. The first and second conductive plates 41 and 43 have opening portions 410 and 430, respectively, at positions corresponding to the two sides of the circuit board 30. Other structure of this embodiment is the same as that of the first embodiment, description thereof being omitted.

The portable radio apparatus 10*a* arranged in the manner described above has the same effects as those of the first embodiment. That is, since the antenna member 20 is a slot antenna, the magnetic field component is detected. Further, when the portable radio apparatus loa is put in a chest pocket, the antenna gain is increased due to the image effect of the human body.

Further, in the portable radio apparatus 10*a*, since the side portion 400 of the antenna member 40 curvedly bulges toward an outer periphery thereof so that it matches the shape of the side portion 130 of the casing 13 which curvedly bulges toward an outer periphery thereof, there is no useless space on the inner side of the side portion 130 of the casing 13. Thus, a high degree of freedom can be obtained in designing of the portable radio apparatus 10, while a reduction in the size thereof can be achieved.

Third Embodiment

Figure 17:
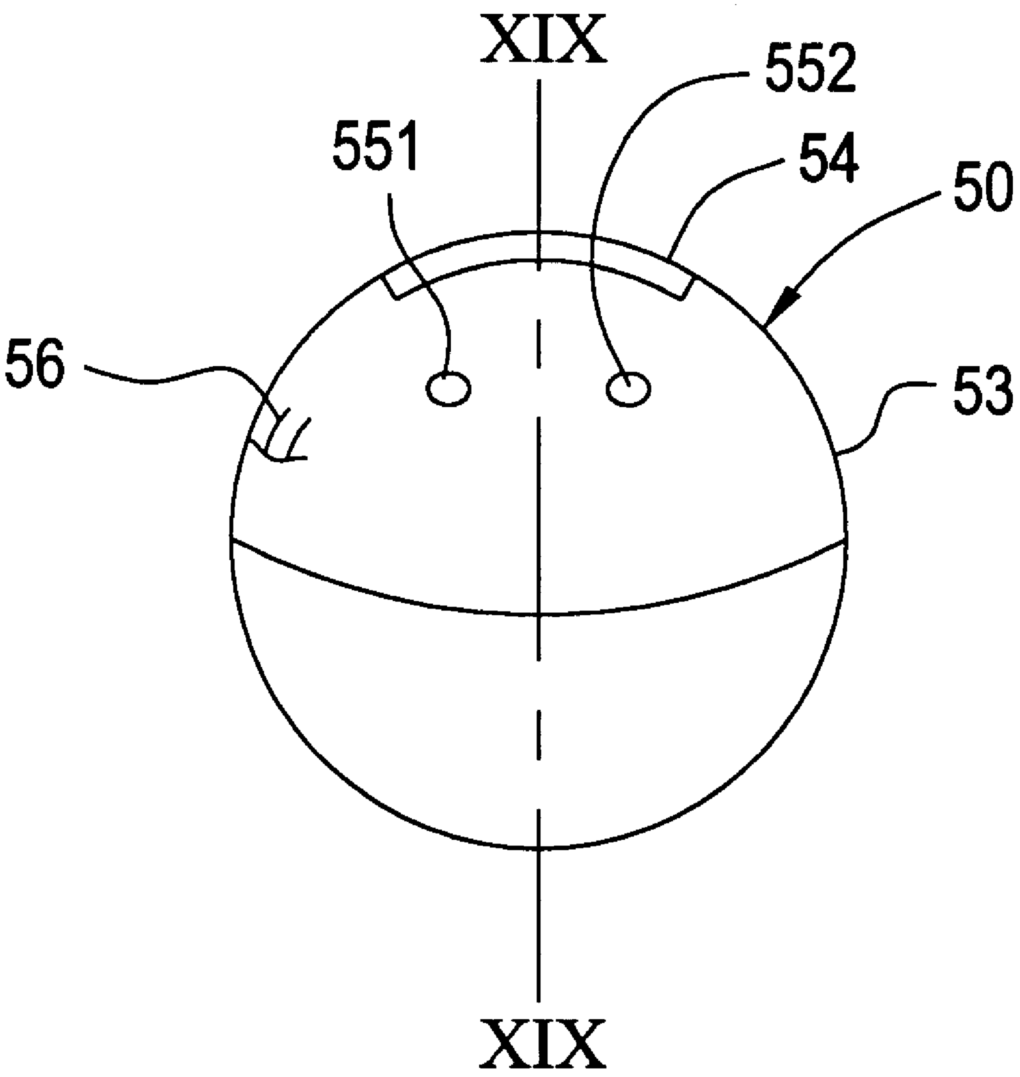
FIG. 17 is a perspective view of a third embodiment of a portable radio apparatus according to the present invention.
Figure 18A:
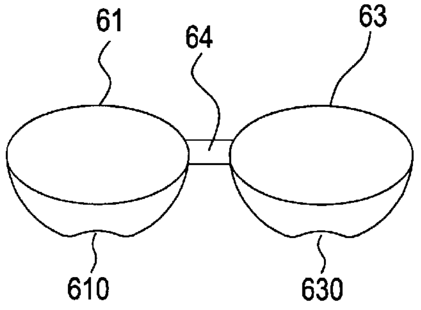
FIG. 18(*a*) is an expansion plan view of the antenna member incorporated in the portable radio apparatus shown in FIG. 17.
Figure 18B:
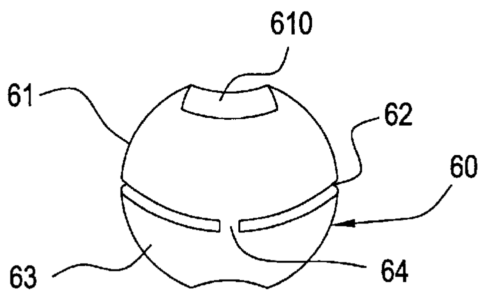
Figure 18C:
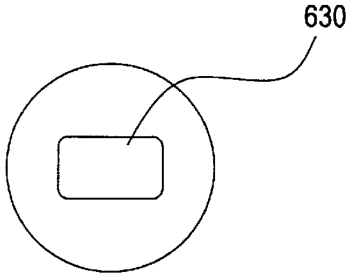
Figure 18D:
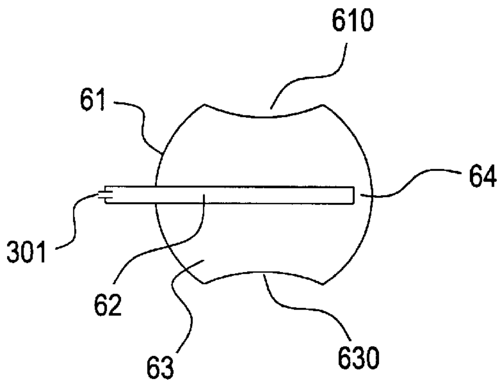

FIG. 17 is a perspective view illustrating an external shape of the portable radio apparatus according to a third embodiment. FIG. 18(*a*) is a development view of an antenna member employed in the third embodiment. FIG. 18(*a*) is a perspective view of the antenna member. FIG. 18(*c*) is a bottom surface of the antenna member. FIG. 18(*d*) is a side elevational view of the antenna member.

In a portable radio apparatus 50 shown in FIG. 17, a radio apparatus casing 53 has a substantially spherical shape, and a liquid crystal display panel 54 with a protective lens is disposed at a position corresponding to the pole of that spherical shape. Operation buttons 551 and 552 are disposed at the side of the liquid crystal display panel 54. The arrow mark 56 is provided on a radio apparatus casing 53 to indicate that the radio apparatus 10 is put in a pocket and carried with this side up. When the portable radio apparatus 50 is carried with the side marked by the mark 56 up, the sensitivity of the portable radio apparatus 50 becomes maximum.

As shown in FIGS. 18(*a*) to 18(*c*), such a spherical portable radio apparatus 50 accommodates an antenna member 60 which is a slot antenna member, formed by superimposing substantially semi-spherical first and second conductive plates 61 and 63 on top of the other in such a manner that a slot groove 62 is provided therebetween. The first conductive plate 61 is electrically short-circuited to the second conductive plate 63 through the short-circuiting portion 64. As schematically illustrated in FIG. 18(*d*), the tuning capacitor element 301 is connected to both the first and second conductive plates 61 and 63 at a position opposite to that where the short-circuiting portion 64 is provided. The first conductive plate 61 has an opening portion 610 at a portion thereof corresponding to the pole of the spherical form.

Figure 19:
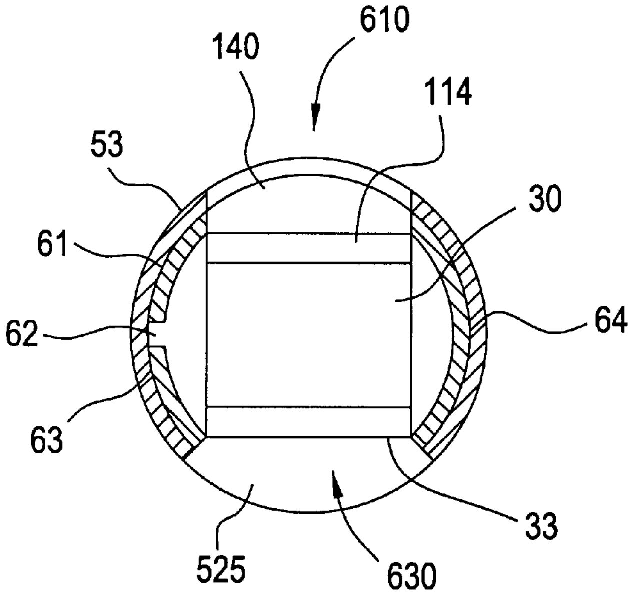
FIG. 19 is a cross-sectional view along the line XIX—XIX of the portable radio apparatus of FIG. 17.

FIG. 19 is a vertical cross-sectional view of the portable radio apparatus 50. The liquid crystal display panel 14 with the protective lens 140 is disposed at the opening portion 610 of the first conductive plate 61. An opening portion 630 is formed at a portion of the second conductive plate 63 corresponding to the pole so that the user can replace the electric cell 33 with a new one through the opening portion 630 by opening a rear lid 525.

In this embodiment, since the interior of the antenna member 60 is relatively wide, the circuit board 30 is disposed within the antenna member 60 as a circuit block. However, since the radio apparatus circuit constituted by the circuit board 30 is the direct conversion type, the local oscillator is disposed in the same manner as those of the previous embodiments at a position deviating from the central portion of the antenna member 60 toward the short-circuiting portion 64 so that the noise generated by the local oscillator does not supply the antenna member 60. The circuit board 30 itself may be disposed at a position deviating from the center of the antenna member 60 toward the short-circuiting portion 64. The other structure of this embodiment is the same as that of the first embodiment.

The portable radio apparatus 50 arranged in the manner described above has the same effects as those of the first embodiment. That is, since the antenna member 60 is a slot antenna, the magnetic field component is detected. Further, when carried around in a chest pocket, the antenna gain is increased due to the image effect of the human body.

Furthermore, in the portable radio apparatus 50, the spherical antenna member 60 is formed by semi-spherical first and second conductive plates 61 and 63 so that it matches the spherical shape of the radio apparatus casing 53, and such an antenna member 60 is accommodated in the casing 53. Accordingly, there is no useless space within the casing 53, and consequently, a high degree of freedom can be obtained in designing the portable radio apparatus 50, and a reduction in the size thereof can be achieved.

Fourth Embodiment

Figure 20:
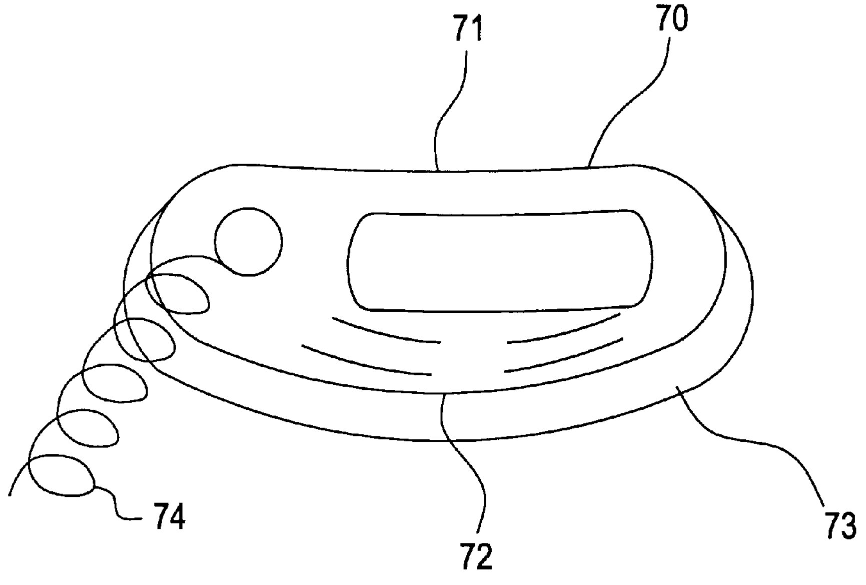
FIG. 20 is a perspective view of a portable radio apparatus of a fourth embodiment.

FIG. 20 illustrates a portable radio apparatus 70 as a modification of the first and second embodiments. The portable radio apparatus 70 has shape in which a recessed portion 71 is formed at one side thereof while a bulging portion 72 is formed on the other side. This facilitates the user's holding of the portable radio apparatus 70. A side portion 73 bulges toward an outer periphery thereof, and a slot antenna member, such as that employed in the first or second embodiment in which the side portion thereof bulges toward an outer periphery thereof, is used, although not shown, so as to achieve reduction in the entire size of the portable radio apparatus 70. Such a portable radio apparatus 70 has advantages in that it has good design and in that it allows the user to feel with hands the direction in which the portable radio apparatus 70 is directed in a pocket. Further, when the portable radio apparatus 70 is hung using a curled cord 74, as shown in FIG. 1(*d*), an antenna gain can be increased. Further, the portable radio apparatus 70 enables the user to carry it handily as if the user is wearing an accessory.

As will be understood from the foregoing description, in the portable radio apparatus provided in one aspect of the invention, the radio apparatus casing has the side portion which bulges toward an outer periphery thereof. The first and second conductive plates, constituting the slot antenna member, have the side portions which bulge toward outer peripheral edges thereof and form the slot groove therein. In another aspect of the invention, the radio apparatus casing has a substantially spherical form. The first and second conductive plates, constituting the slot antenna member accommodated in the radio apparatus casing, have a substantially semi-spherical external shape. Thus, in the invention, since the shape of the slot antenna matches the shape of the radio apparatus casing, there is no useless space in the radio apparatus casing, thus reducing the size of the portable radio apparatus.

The first and second conductive plates have an opening portion at an area which faces the circuit board. Thus, the noise generated from the electronic parts mounted on the circuit board can be released from the opening portions, thus increasing the sensitivity of the radio apparatus.

Since the circuit board, which is the noise generating source, or the local oscillator mounted on the circuit board is disposed at a position deviating from the central portion of the antenna member toward the short-circuiting portion, the noise generation source can be separated from the high impedance portion of the antenna member. In this structure, since a noise signal does not readily supply the antenna member, even if the direct conversion method is employed, transmission or reception of the portable radio apparatus and the other radio apparatuses is not interfered. Particularly, in a structure in which the orthogonal transform mixer circuit and the base band signal detecting circuit are in the same IC and in which the local oscillator and the mixer circuit are connected to each other through a printed pattern, although a radiation level of the oscillated signal is high, an influence of that radiation can be eliminated. This effect can be increased when the operation clock of the booster circuit, which can be the cause of the side band noise which occurs in the oscillated signal, is set in the no-pass band of the low-pass filter of the direct conversion detecting circuit and when a crystal oscillator is used as the clock source.

Further, the high-frequency amplifying circuit of the radio apparatus circuit is electrically connected to the conductive plate located on the side of the circuit board which is opposite to the side thereof where the local oscillator circuit of the radio apparatus circuit is provided, to reduce an influence of the noise from the local oscillator circuit.

A dielectric material is filled in the slot groove, whereby the reception wavelength is shortened, enabling a small antenna to receive signals of long wavelengths.

What is claimed is:

1. A portable radio apparatus, comprising:

a casing;

a circuit board within the casing, the circuit board comprising a radio apparatus circuit that includes a direct conversion circuit and a local oscillating circuit, the radio apparatus circuit being located on a first side of the circuit board closest to the short-circuit elements;

a booster circuit, wherein the direct conversion circuit is driven by the boozers circuit, the booster circuit boosting an electric cell voltage, an operating frequency of the booster circuit being in a non-pass band of a base-band-signal-filtering circuit of the radio apparatus circuit; and a slot antenna within the casing, the slot antenna being formed by a first conductive plate and a second conductive plate, the circuit board being disposed between the first and second conductive plates, the first and second conductive plates having central portions and perimeter portions, the central portions being separated by a first distance, the perimeter portions having peripheral edges, the peripheral edges being separated by a second distance which is less than the first distance, portions of the first and the second conductive plates between the central portions and the peripheral edges having a third distance, the third distance decreasing from the central portions toward the peripheral edges, the peripheral edges forming a slot of the slot antenna, and the slot being bridged by a short-circuit element across the peripheral edges.

2. The portable radio apparatus of claim 1, further comprising a crystal oscillator, wherein the operating frequency of the booster circuit is determined by the crystal oscillator.

3. A portable radio apparatus comprising:

a casing;

a circuit board within the casing, the circuit board comprising a radio apparatus circuit;

a slot antenna within the casing, the slot antenna being formed by a first conductive plate and a second conductive plate, the circuit board being disposed between the first and second conductive plates, the first and second conductive plates having central portions and perimeter portions, the central portions being separated by a first distance, the perimeter portions having peripheral edges, the peripheral edges being separated by a second distance which is less than the first distance, portions of the first and the second conductive plates between the central portions and the peripheral edges having a third distance, the third distance decreasing from the central portions toward the peripheral edges, the peripheral edges forming a slot of the slot antenna, and the slot being bridged by a short-circuit element across the peripheral edges;

a local oscillator circuit;

a direct conversion circuit;

a high-frequency-amplifying circuit, wherein the radio apparatus circuit includes the direct conversion circuit, and the high-frequency-amplifying circuit of the radio apparatus circuit is electrically connected to one of the first and second conductive plates and located on a side of the circuit board opposite an other side of the circuit board which has the local oscillator circuit; and a booster circuit, wherein the direct conversion circuit is driven by the booster circuit, the booster circuit boosting an electric cell voltage, an operating frequency of the booster circuit being in a non-pass band of a base-band-signal-filtering circuit of the radio apparatus circuit.

4. The portable radio apparatus of claim 3, further comprising a crystal oscillator, wherein the operating frequency of the booster circuit is determined by the crystal oscillator.

5. A portable radio apparatus, comprising:

a casing;

a circuit board within the casing, the circuit board comprising a radio apparatus circuit that includes a direct conversion circuit and a local oscillating circuit, the radio apparatus circuit being located on a first side of the circuit board closest to the short circuit element;

a booster circuit, wherein the direct conversion circuit is driven by the booster circuit, the booster circuit boosting an electric cell voltage, an operating frequency of the booster circuit being in a non-pass band of a base-band-signal-filtering circuit of the radio apparatus circuit; and a slot antenna within the casing, the slot antenna formed by a first conductive plate and a second conductive plate, the circuit board being disposed between the first and second conductive plates, the first and second conductive plates and the casing having a substantially semi-spherical surface, peripheral edges of the first and second conductive plates forming a slot of the slot antenna, and the slot being bridged by a short-circuit element across the peripheral edges.

6. The portable radio apparatus of claim 5, further comprising a crystal oscillator, wherein the operating frequency of the booster circuit is determined by the crystal oscillator.

7. A portable radio apparatus, comprising:

a casing;

a circuit board within the casing, the circuit board comprising a radio apparatus circuit;

a slot antenna within the casing, the slot antenna formed by a first conductive plate and a second conductive plate, the circuit board being disposed between the first and second conductive plates, the first and second conductive plates and the casing having a substantially semi-spherical surface, peripheral edges of the first and second conductive plates forming a slot of the slot antenna, and the slot being bridged by a short-circuit element across the peripheral edges;

a direct conversion circuit;

a high-frequency amplifying circuit, wherein the radio apparatus circuit is the direct conversion circuit and the high-frequency amplifying circuit of the radio apparatus circuit is electrically connected to one of the first and second conductive plates and located on a side of the circuit board opposite another side of the circuit board which has a local oscillator circuit; and a booster circuit, wherein the direct conversion circuit is driven by the booster circuit, the booster circuit boosting an electric cell voltage, an operating frequency of the booster circuit being in a non-pass band of a base-band-signal-filtering circuit of the radio apparatus circuit.

8. The portable radio apparatus of claim 7, further comprising a crystal oscillator, wherein the operating frequency of the booster circuit is determined by the crystal oscillator.

* * * * *